United States Patent [19]

Aihara et al.

[11] 4,122,052

[45] Oct. 24, 1978

[54] EMULSION COMPOSITION

[75] Inventors: Tetsuo Aihara; Yasuharu Nakayama; Yoshio Yamashita; Tadashi Watanabe; Isao Toyomoto, all of Hiratsuka, Japan

[73] Assignee: Kansai Paint Company, Limited, Amagasaki, Japan

[21] Appl. No.: 774,549

[22] Filed: Mar. 4, 1977

[30] Foreign Application Priority Data

Mar. 9, 1976 [JP] Japan .................................. 51-25408
Mar. 16, 1976 [JP] Japan .................................. 51-28732

[51] Int. Cl.² .............................................. C08L 91/00
[52] U.S. Cl. ........................... 260/23 EM; 260/23 AR; 260/23.7 A; 260/29.6 RW; 260/29.6 WB; 260/29.7 UP; 260/29.7 W
[58] Field of Search ................. 260/29.7 UP, 29.7 W, 260/29.6 RW, 29.6 WB, 23.7 A, 23 EM, 23 AR

[56] References Cited

U.S. PATENT DOCUMENTS

| | | | |
|---|---|---|---|
| 3,988,273 | 10/1976 | Aihara et al. | 260/23 AR |
| 3,993,612 | 11/1976 | Aihara et al. | 260/23.7 A |
| 4,009,138 | 2/1977 | Kobashi et al. | 260/29.7 W |

*Primary Examiner*—Eugene C. Rzucidlo
*Attorney, Agent, or Firm*—Larson, Taylor and Hinds

[57] ABSTRACT

An emulsion composition prepared by the emulsion polymerization of a polymerizable vinyl monomer in the presence of an emulsifier characterized in that the emulsifier is a neutralized copolymer of (A) a monomer prepared by being allowed at least one glycidyl ester of arcylic acid and methacrylic acid to react with at least one fatty acid of drying oil fatty acid and semi-drying oil fatty acid, (B) $\alpha,\beta$-ethylenically unsaturated acid and (C) an unsaturated monomer containing substantially no carboxyl group and having a Q value of at least 0.1 as determined by Q-e theory.

6 Claims, No Drawings

EMULSION COMPOSITION

This invention relates to emulsion compositions which are hardenable by oxidation, and more particularly to emulsion compositions to be hardened by oxidation which are obtained by the emulsion polymerization of a polymerizable vinyl monomer using as an emulsifier high-molecular-weight resin hardenable by oxidation.

Various attempts have heretofore been made to obtain emulsions hardenable by oxidation using high-molecular-weight resin hardenable by oxidation as an emulsifier for emulsion polymerization. For example, emulsions are known which are prepared with use of maleinized polybutadiene, maleinized oil or maleinized alkyd resin as an emulsifier. However, such emulsions have the following drawbacks. The emulsion prepared with use of maleinized 1,4-polybutadiene as an emulsifier has poor weather resistance and is prone to degradation by ultraviolet rays because the emulsifier contains too many double bonds. The emulsion obtained with use of maleinized 1,2-polybutadiene as an emulsifier has great cross-linking properties, so that the polymer constituting the emulsion particles are in the form of high polymer molecules. Accordingly coating compositions prepared from such emulsion are not amenable to coating operations. Said emulsion is not always satisfactory in weather resistance because the emulsifier contains many double bonds. Further when preparing an emulsion with use of maleinized oil or maleinized alkyd resin as an emulsifier, the polymerizable vinyl monomer to be subjected to emulsion polymerization is not fully compatible with the emulsifier and the polymerization system contains the polymerizable vinyl monomer and unsaturated bonds of the chain termination type (derived from drying oil fatty acid or semi-drying oil fatty acid) in a random mixture, with the result that the emulsion is not readily available. In addition, such resins tend to be darkened in a maleinized process. The process has been provided by the present inventors as copending U.S. Pat. application Ser. No. 718,767. It is therefore difficult to obtain a white emulsion composed of fine particles and hardenable by oxidation.

An object of this invention is to provide an excellent emulsion composition to be hardened by oxidation and free of the foregoing drawbacks of the emulsions heretofore known.

Another object of this invention is to provide an emulsion composition prepared by the emulsion polymerization of a polymerizable vinyl monomer with use of an emulsifier which is colorless and compatible with the monomer, the emulsion being white, readily formable, composed of fine particles and satisfactorily hardenable by oxidation.

Another object of this invention is to provide an emulsion composition in which the polymer constituting the particles of the emulsion is not in the form of high polymer particles and which is therefore highly amenable to coating operation.

Another object of this invention is to provide an emulsion composition which is comparable to those heretofore available in giving coatings having excellent resistance to water and corrosion, high adhesiveness and especially outdoor weather resistance.

Other objects and features of this invention will become apparent from the following description.

This invention provides an emulsion composition prepared by the emulsion polymerization of a polymerizable vinyl monomer in the presence of an emulsifier characterized in that the emulsifier is a neutralized copolymer of (A) a monomer prepared by reacting at least one glycidyl ester of acrylic acid and methacrylic acid with at least one fatty acid of drying oil fatty acid and semi-drying oil fatty acid, (B) $\alpha,\beta$-ethylenically unsaturated acid and (C) an unsaturated monomer containing substantially no carboxyl group and having a Q value of at least 0.1 as determined by Q-e theory.

The emulsifiers useful in the invention have a number average molecular weight variable over a wide range, preferably from about 500 to about 50,000, more preferably from about 1,000 to about 15,000 as determined by gel permeation chromatography. They have an appropriate structure for use as emulsifiers for the emulsion polymerization of polymerizable vinyl monomers. More specifically the emulsifiers of the invention comprise an addition polymerization polymer as the main chain and a drying or semi-drying oil fatty acid residue as a side chain, the main chain and the side chain being linked together by an ester bond between the hydroxyl or epoxy on the main chain and the carboxyl on the side chain. The water soluble carboxyl groups are present on the main chain which is rendered free of the drawbacks based on the hydrolysis. The copolymer to be used in the invention is prepared by radical copolymerization of the three components of (A), (B) and (C).

A great amount of drying oil or semi-drying oil fatty acid is necessary when the copolymer is rendered water-soluble by maleinization. The copolymer of the invention is colorless and contains relatively small amount of drying oil or semi-drying oil fatty acid which influences upon properties of a film without necessity of maleinization. When a polymerizable vinyl monomer is added to an aqueous solution of the emulsifier and the mixture stirred, an emulsion uniformly dispersed is obtained since the vinyl monomer is highly compatible with the addition polymerization polymer portion of the emulsifier which closely resembles the monomer in structure.

On the other hand, the chain transfer type-double bonds contained in the drying oil or semi-drying oil fatty acid are less likely to interfere with the emulsion polymerization, because the very active points of the emulsifier for radical polymerization are already damaged in radical copolymerization of the three components of (A), (B) and (C). Consequently, the emulsions obtained by the invention are excellent in storage-stability and the films obtained from the emulsion is excellent in water-resistance, alkali-resistance, out-door weather resistance and colorness. Further unlike the case wherein maleinized polybutadiene is used, the emulsion contains less carbon-carbon double bonds (but is higher in the activity) than maleinized polybutadiene and has out-door resistance to weather. As compared with the case in which 1,2-vinyl type polybutadiene is used, the polymer constituting the emulsion is rendered suitably lower-molecular-weight, so that the emulsion is satisfactorily usable for coating operation and rapidly undergoes cross linking after application, giving coatings of improved properties and higher weather resistance.

The above object is accomplished by emulsion polymerization of a polymerizable vinyl monomer in the presence of an emulsifier, the emulsifier being a neutralized copolymer of (A) a monomer prepared by reacting at least one glycidyl ester of acrylic acid and methacrylic acid with at least one fatty acid of drying oil fatty acid and semi-drying oil fatty acid (hereinafter referred to as "modified monomer A"), (B) an α,β-ethylenically unsaturated acid (hereinafter referred to as "unsaturated acid B") and (C) an unsaturated monomer containing substantially no carboxyl group and having a Q value of at least 0.1 as determined by Q-e theory (hereinafter referred to as "unsaturated monomer C").

The Q-e theory referred to above was advocated by Alfrey and Price for the first time in 1947 as to the velocity of addition reaction of a monomer with a radical, and the Q value is a constant representing the general reactivity of the monomer as an essential factor of the theory. Generally, the greater the Q value, the higher is the radical reactivity of the monomer concerned. The Q-e theory is sef forth for example in T. Alfrey, Jr., C. C. Price, Journal Polymer Science 2, 101 (1947) and T. Alfrey, Jr., J. J. Bohrer, H. Mark, Copolymerization (Interscience Publishers, New York, 1952).

The modified monomer A, a component of the copolymer resin to be used in the invention, is a monomer prepared by reacting a glycidyl ester of acrylic acid or methacrylic acid with drying oil fatty acid and/or semi-drying oil fatty acid. It is a reaction product of 1 mole of fatty acid and 0.8 to 1.2 moles of glycidyl ester of acrylic acid or methacrylic acid. Useful for the preparation of the modified monomer A are various drying oil fatty acids and semi-drying oil fatty acids having about 12 to 24 carbon atoms. At least one of such fatty acids is used. Examples of these fatty acids are safflower oil fatty acid, linseed oil fatty acid, soybean oil fatty acid, sesame oil fatty acid, poppyseed oil fatty acid, perilla oil fatty acid, hempseed oil fatty acid, grape-kernel oil fatty acid, corn oil fatty acid, tall oil fatty acid, sunflower oil fatty acid, cottonseed oil fatty acid, walnut oil fatty acid, rubberseed oil fatty acid, sugar cane oil fatty acid, etc., among which safflower oil fatty acid, linseed oil fatty acid, soybean oil fatty acid, perilla oil fatty acid, tall oil fatty acid, sunflower oil fatty acid and hempseed oil fatty acid are especially preferable. Also, unsaturated fatty acids having conjugated double bonds are usable as a part of drying oil fatty acid and semi-drying oil fatty acid. Examples of such conjugated fatty acid are tung oil fatty acid, oiticica oil fatty acid, dehydrated castor oil fatty acid and Hidiene fatty acid (trade mark of conjugated fatty acid, produced by Soken Kagaku Co., Ltd., Japan). The amount of the conjugated fatty acid is in the range of less than 30 wt.% based on total fatty acid.

Usable as glycidyl ester, the other component of the modified monomer A, are glycidyl acrylate and glycidyl methacrylate.

The modified monomer A is prepared usually by reacting the above two components at a temperature of 60° to 220° C., preferably 120° to 170° C., for about 0.5 to 40 hours, preferably 3 to 10 hours in the absence or presence of a reaction catalyst such as tetraethyl ammonium bromide, although these conditions vary with the kind of the fatty acid used. In order to render the modified monomer A more preservable, it is possible to add thereto a polymerization inhibitor such as hydroquinone, p-benzoquinone, etc.

A wide variety of acids having α,β-ethylenically unsaturated double bond are useful as the unsaturated acid B, another constituent of the copolymer to be used in the invention. Generally usable are acrylic acid, methacrylic acid, crotonic acid, maleic acid, maleic anhydride, fumaric acid and half esterified product of maleic acid having the following general formula:

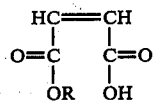

wherein R is alkyl having 1 to 4 carbon atoms, among which acrylic acid, methacrylic acid, crotonic acid, maleic acid, maleic anhydride and fumaric acid are preferable.

Usable as the unsaturated monomer C, another constituent of the copolymer to be used in the invention are unsaturated monomers containing substantially no carboxyl group and having a Q value of at least 0.1 as determined by Q-e theory, preferably those having a Q value of 0.1 to 1.5. When the unsaturated monomer C having a Q value of less than 0.1 is used, the obtained copolymer tends not to cure at room temperatures. Usable examples are various acrylates or methacrylates, acrylonitrile or methacrylonitrile, acrylic or methacrylic amides, olefins having an aromatic or heterocyclic ring, dienes, etc. These monomers are used singly or in admixture with one another. Examples of the above-mentioned acrylates or methacrylates are versatile and include acrylates or methacrylates of alkyl having about 1 to 18 carbon atoms, alkoxy-substituted alkyl, allyl-substituted alkyl, amono-substituted alkyl, allyloxy-substituted alkyl, hydroxy-substituted alkyl, glycidyl, etc. More specific examples are methyl acrylate or methacrylate, ethyl acrylate or methacrylate, propyl acrylate or methacrylate, butyl acrylate or methacrylate, 2-ethylhexyl acrylate or methacrylate, lauryl acrylate or methacrylate, stearyl acrylate or methacrylate, glycidyl acrylate or methacrylate, methoxybutyl acrylate or methacrylate, ethoxybutyl acrylate or methacrylate, allyl acrylate or methacrylate, 2-hydroxyethyl acrylate or methacrylate, 2-hydroxypropyl acrylate or methacrylate, diethylaminoethyl acrylate or methacrylate, allyloxyethyl acrylate or methacrylate, esterified product of glycidyl acrylate or glycidyl methacrylate with saturated fatty acid having 1 to 18 carbon atoms, etc. Examples of olefins having an aromatic or heterocyclic ring are styrene, α-methylstyrene, vinyltoluene, vinylpyridine, etc. Examples of dienes include butadiene, isoprene, chloroprene, etc. Exemplary of acrylic or methacrylic amides are N-methylolacrylamide, N-methylolmethacrylamide, N-butoxymethylacrylamide, N-butoxymethylmethacrylamide, etc.

Especially preferable to use are styrene, vinyltoluene and acrylic or methacrylic esters represented by the formula

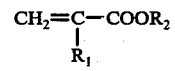

wherein $R_1$ is hydrogen or methyl, $R_2$ is alkyl with 1 to 18 carbon atoms.

The proportions of modified monomer A, unsaturated acid B and unsaturated monomer C used to prepare the copolymer are 4.5 to 90 wt.% for modified monomer A (oil length 3–60%), 8 to 30 wt.% for unsaturated acid B and 2 to 87.5 wt.% for unsaturated monomer C, and are preferably about 25 to 80 wt.% for monomer A, about 10 to 20 wt.% for unsaturated acid B and about 5 to 65 wt.% for unsaturated monomer C. The copolymer usually has an acid value of about 40 to 180 and an average molecular weight of about 500 to 50,000, preferably an acid value of 50 to 150 and an average molecular weight of about 1,000 to 15,000.

The present invention in which the maleinized process is not effected will assume a rapid curable property inherent in the emulsion even if a small amount of the drying oil or semi-drying oil is used.

The amount of modified monomer A, if less than 7.5 wt.% impairs curing property at ambient temperatures, also, if more than 95 wt.% is used, it is impossible to render the obtained copolymer water soluble.

The emulsifier to be used in the invention has enough solubility in water in order to disperse a sufficient amount of hydrophobic monomer. On the other hand, the water resistance of the cured coating film is ameliorated by addition of hydrophobic monomer. Consequently, the amount of unsaturated acid (B) to prepare the copolymer is 8 to 30 wt.%, which is larger than 5 to 17.5 wt.% in the case of the utilization as a water soluble coating composition (U.S. Pat. No. 3,988,273). If less than 8 wt.% of unsaturated acid B is used, it is difficult to render the obtained copolymer water soluble, but the amount more than 30 wt.% impairs water resistance of the cured coating film. Further, unsaturated monomer C is used to adjust the properties of the copolymer obtained. Thus constituent proportions outside the foregoing range is objectionable.

The polymerization of modified monomer A, unsaturated acid B and unsaturated monomer C can be conducted under the same conditions as in the conventional polymerization. For example, polymerization can be conducted in solvent in the absence or presence of a radical initator or under irradiation of radiations. Initiators to be used are, for example, organic or inorganic peroxides, sulfides, sulfines, sulfinic acids, azo compounds, diazo compounds, nitroso compounds, redox initiators, etc. Besides there may be used actinic light, electron beam, γ-ray, X-ray, etc. singly or in combination with the above initiators.

The polymerization is carried out at a temperature of 0° to 200° C., preferably about 40° to 170° C. for 1 to 20 hours, preferably for about 3 to 10 hours. Especially preferable is a polymerization method employing a solvent in which the copolymer obtained is soluble and which is miscible with water. This method has the advantage that the copolymer obtained is usable as it is for the preparation of aqueous coating composition of this invention without the necessity of removing the solvent from the copolymer. Examples of such water soluble solvent are solvents represented by ROH wherein R is alkyl having 1 to 4 or 6 carbon atoms, such as methyl alcohol, ethyl alcohol, propyl alcohol, butyl alcohol and hexyl alcohol; solvents represented by HO—CH$_2$CH$_2$—OR wherein R is hydrogen or alkyl having 1 to 8 carbon atoms, such as ethylene glycol, ethylene glycol monobutyl ether and ethylene glycol monoethyl ether; solvents represented by HO—CH$_2$CH$_2$—OCH$_2$CH$_2$OR wherein R is the same as above, such as diethylene glycol, diethylene glycol monomethyl ether and diethylene glycol monobutyl ether; solvents represented by R$_1$O—CH$_2$CH$_2$—OR$_2$ wherein R$_1$ and R$_2$ are the same or in difference of alkyl having 1 to 3 carbon atoms, such as ethylene glycol dimethyl ether; solvents represented by R$_1$O—CH$_2$CH$_2$OCH$_2$—CH$_2$OR$_2$ wherein R$_1$ and R$_2$ are the same as above, such as diethylene glycol dimethyl ether; solvents represented by RO—CH$_2$C-H$_2$OCO—CH$_3$ wherein R is the same as above, such as ethylene glycol monoacetate and ethylene glycol monomethyl ether acetate; diacetone alcohol; dioxane; tetrahydrofuran; acetone; dimethylformamide; etc. For the preparation of the copolymer of this invention, water insoluble solvents are also usable if they have a boiling point of up to 250° C., because such solvents are removable by distillation at atmospheric or reduced pressure after the completion of the polymerization reaction. These solvents include, for example, toluene, xylene and like aromatic solvents.

The amount of such solvent, which is variable over a wide range, is usually about 15 to 90 wt.%, preferably about 30 to 75 wt.%, based on the copolymer solution.

To render the copolymer thus prepared soluble or dispersible in water, the carboxyl groups in the copolymer are neutralized with a neutralizing agent. Useful for this purpose are a wide variety of known neutralizing agents such as hydroxides, carbonates or bicarbonates of alkali metals, ammonia and amines.

Examples of amines are primary, secondary and tertiary alkylamines or aliphatic amines and primary, secondary and tertiary alkanol amines or alicyclic amines, etc. Preferable examples of hydroxides of alkali metals are lithium hydroxide, sodium hydroxide, potassium hydroxide, etc., those of alkali metal carbonates are sodium carbonate, potassium carbonate, etc. and those of alkali metal bicarbonates include lithium bicarbonate, sodium bicarbonate and potassium bicarbonate. The copolymer is effectively neutralized under conventional conditions; for example, the copolymer is contacted with a neutralizing agent, preferably with an aqueous solution thereof.

The emulsion compositions of this invention can be obtained by subjecting a polymerizable vinyl monomer to emulsion polymerization with use of the emulsifier prepared in the foregoing manner.

A wide variety of polymerizable vinyl monomers are useful in this invention. As is the case with usual emulsion polymerization, however, it is not preferable to use a large quantity of hydrophilic vinyl monomers. In the present invention, it is preferable to use vinyl monomers free from too active radicals. When vinyl monomers which produce too active radicals are used, the vinyl monomers sometimes react with drying oil fatty acid and/or semi-drying oil fatty acid to thereby reduce the amount of polymer to be obtained and to impair the hardening property of the resulting emulsion. Examples of useful polymerizable vinyl monomers are:

esters represented by the formula CH$_2$=C(R$_{10}$)COOR$_{11}$ wherein R$_{10}$ is hydrogen or CH$_3$, and R$_{11}$ is alkyl having 1 to 26 carbon atoms;

esters represented by the formula CH$_2$=C(R$_{10}$)COOR$_{12}$ wherein R$_{10}$ is as defined above, R$_{12}$ is

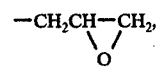

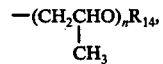

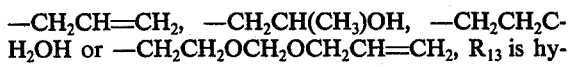

R$_{13}$ is hydrogen or alkyl having 1 to 25 carbon atoms, $R_{14}$ is alkyl having 1 to 8 carbon atoms, and $n$ is an integer of 1 to 8;

esters represented by the formula $CH_2=C(CH_3)COOR_{15}$ wherein $R_{15}$ is $-CH_2CH_2OH$;

diolefins represented by the formula $R_{16}CH=C(R_{17})CH=CH_2$ wherein $R_{16}$ is hydrogen or $CH_3$, and $R_{17}$ is hydrogen, $CH_3$ or Cl;

styrene, vinyltoluene, α-methylstyrene, methacrylonitrile, addition product of acrylic acid or methacrylic acid and Cardura-E (trade mark of glycidyl ester of synthetic tertiary carboxylic acid, Product of Shell Chemical Co., U.S.A., general formula:

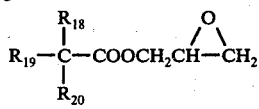

wherein $R_{18}$, $R_{19}$ and $R_{20}$ are alkyl and the total carbon number of them ranges between 7 and 9), vinyl acetate and VeoVa monomers. These polymerizable vinyl monomers are used singly, or at least two of them are used conjointly. Furthermore, such vinyl monomer is used conjointly with up to 20%, preferably up to 10% by weight of water-soluble or hydrophilic vinyl monomer based on the weight of the former.

Examples of the latter vinyl monomers are:

carboxylic acids represented by the formula $CH_2=C(R_{21})COOH$ wherein $R_{21}$ is hydrogen or $CH_3$;

carboxylic acid amides represented by the formula $CH_2=C(R_{21})CONHR_{22}$ wherein $R_{21}$ is as defined above, and $R_{22}$ is hydrogen, $-CH_2OH$ or $-CH_2OC_4H_9$;

compounds represented by the formula $CH_2=CHR_{23}$ wherein $R_{23}$ is CN or CHO;

N-methylacrylamide, N-ethylacrylamide, dimethylaminoethyl methacrylate, diethylaminoethyl methacrylate, hydroxyethyl acrylate, vinylpyridine, vinylpyrrolidone, etc.

The proportions of the emulsifier and the polymerizable vinyl monomer to be used in this invention are preferably such that the total solid content of the resulting emulsion has an acid value of about 3 to about 150, more preferably about 15 to about 50. The concentration of the solids in the emulsion composition is preferably about 15 to about 65% by weight.

The emulsion polymerization for preparing the emulsion compositions of this invention may be carried out by usual known methods. Generally the polymerization is conducted with stirring. After the monomer has been emulsified with stirring, the reaction system may be further processed in a stationary state. It is not always necessary to use a polymerization initiator, but such agent may be used in a usual manner to effect the polymerization promptly. Any of radical-producing initiators may be used for this purpose. Generally initiators of the peroxide type and azo type are useful.

The emulsions obtained according to this invention are used as coating compositions which are hardenable at room temperature. However they are also useful as coating compositions which are dried by baking. They are also usable for a wide variety of applications for example for processing resins. Even when singly used, the emulsions of this invention give coatings which are outstanding in resistance to water, corrosion and weather and in adhesiveness. They are also usable in admixture with other water-soluble resins to improve the properties of the resulting coatings.

This invention will be described below in greater detail with reference to Examples and Comparison Examples, in which the parts and percentages are all by weight unless otherwise specified.

EXAMPLE 1

(1-a)

Into an 1-l reactor were placed 236 parts of safflower oil fatty acid, 119 parts of glycidyl methacrylate, 0.4 part of hydroquinone and 0.2 part of tetraethyl ammonium bromide, which were then heated at 140°–150° C. with stirring. The amount of residual carboxyl groups was measured to confirm the progress of the reaction between epoxy groups and carboxyl groups. The reaction was completed in about 4.5 hours to produce monomer (1-a) modified with fatty acid.

(1-b)

Into a 1-l reactor 100 parts of ethylene glycol monobutyl ether was placed and heated at 120° C., to which a mixture of 60 parts of the monomer (1-a), 12 parts of n-butyl-methacrylate, 15 parts of styrene, 13 parts of acrylic acid and 4 parts of azobis-dimethylvaleronitrile was added dropwise over a period of about 2 hours at the same temperature with stirring. The reaction was conducted under nitrogen atmosphere. To the resulting reaction product 1 part of azobisisobutyronitrile was added 1 hour after the addition of the mixture and 1 part of azobisisobutyronitrile was further added 2 hours after the first addition of the azobisisobutyronitrile. The mixture was thereafter maintained at the same temperature for 3 hours. The ethylene glycol monobutyl ether and unreacted monomer were distilled off at reduced pressure. This product (1-b) contained as solids 87.0% of resin and had an acid value of 82.

(1-c)

In a 2-l reactor 184 parts of the solution of copolymer (1-b) was neutralized with 0.95 equivalent of triethylamine on the carboxyl group of the resin and was then diluted with 763 parts of water and 32 parts of ethylene glycol monobutyl ether was added to the solution and thoroughly dissolved therein by full stirring. 203 parts of n-butyl methacrylate, 203 parts of 2-ethylhexyl methacrylate and 8 parts of 1,6-hexanediol diacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

EXAMPLE 2

In a 2-l reactor 184 parts of the solution of copolymer (1-b) was neutralized with 0.95 equivalent of triethylamine on the carboxyl groups of the resin and was then diluted with 763 parts of water and 32 parts of ethylene glycol monobutyl ether was added to the solution and thoroughly dissolved therein by full stirring. 406 parts of styrene and 8 parts of 1,6-hexanediol diacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

EXAMPLE 3

In a 2-l reactor 184 parts of the solution of copolymer (1-b) was neutralized with 0.95 equivalent of ammonia based on the carboxyl groups of the resin and then diluted with 771 parts of water and 32 parts of ethylene glycol monobutyl ether was added to the solution and thoroughly dissolved therein by full stirring. 406 parts of n-butyl methacrylate and 8 parts of 1,6-hexanediol diacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

EXAMPLE 4

In a 2-l reactor 184 parts of the solution of copolymer (1-b) was neutralized with 0.95 equivalent of diethylamine on the carboxyl groups of the resin and then diluted with 769 parts of water and 32 parts of ethylene glycol monobutyl ether was added to the solution and thoroughly dissolved therein by full stirring. 406 parts of n-butylmethacrylate and 8 parts of 1,6-hexanedioldiacrylate were added to the resulting solution, and the mixture was thoroughly stirred to obtain a fully emulsified mass, to which a solution of 1 part of ammonium persulfate in 20 parts of water was added. The mixture was reacted for 2 hours with stirring and heating at 80° C. to obtain an emulsion. Table 1 shows the properties of the emulsion.

EXAMPLE 5

Into a 0.5-l reactor 50 parts of ethylene glycol monobutyl ether was placed and heated at 120° C., to which a mixture of 40 parts of the monomer (1-a), 23.5 parts of n-butylmethacrylate, 23.5 parts of styrene, 13 parts of acrylic acid and 5 parts of azobisdimethylvaleronitrile was added dropwise over a period of about 2 hours at the same temperature with stirring. The reaction was conducted under nitrogen atmosphere. To the resulting reaction product 1 part of azobisisobutyronitrile was added 1 hour after the addition of the mixture and 1 part of azobisisobutyronitrile was further added 2 hours after the first addition of the azobisisobutyronitrile. The mixture was thereafter maintained at the same temperature for 3 hours. The ethylene glycol monobutyl ether and unreacted monomer were distilled off at reduced pressure. This copolymer solution contained 79.0% of solid and had an acid value of 87.

In a 2-l reactor 203 parts of the above copolymer solution was neutralized with 0.95 equivalent of ammonia based on the carboxyl groups of resin and was then diluted with 771 parts of water and 13 parts of ethylene glycol monobutyl ether was added to the solution and thoroughly dissolved therein by full stirring. 406 parts of n-butyl methacrylate and 8 parts of 1,6-hexanedioldiacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

EXAMPLE 6

(6-a)

Into a 1-l reactor were placed 236 parts of linseed oil fatty acid, 119 parts of glycidyl methacrylate, 0.4 part of hydroquinone and 0.2 part of tetraethylammonium bromide, which were then heated at 140°–150° C. with stirring. The amount of residual carboxyl groups was measured to confirm the progress of the reaction between epoxy groups and carboxyl groups. The reaction was completed in about 5 hours to produce monomer (6-a) modified with fatty acid.

(6-b)

Into a 1-l reactor 100 parts of ethylene glycol monobutyl ether was placed and heated at 120° C., to which a mixture of 60 parts of the monomer (6-a), 12 parts of n-butyl methacrylate, 15 parts of styrene, 13 parts of acrylic acid and 5 parts of azobisdimethylvaleronitrile was added dropwise over a period of about 2 hours at the same temperature with stirring. The reaction was conducted under nitrogen atmosphere. To the resulting reaction product 1 part of azobisisobutyronitrile was added 1 hour after the addition of the mixture and 1 part of azobisisobutyronitrile was further added 2 hours after the first addition of the azobisisobutyronitrile. The mixture was thereafter maintained at the same temperature for 3 hours. The ethylene glycol monobutyl ether and unreacted monomer were distilled off at reduced pressure. This product (6-b) contained 82.0% of solid resin and had an acid value of 80.

(6-c)

In a 2-l reactor 195 parts of the solution of copolymer (6-b) was neutralized with 0.95 equivalent of ammonia based on the carboxyl groups of the resin and was then diluted with 771 parts of water and 21 parts of ethylene glycol monobutyl ether was added to the solution and thoroughly dissolved therein by full stirring. 406 parts of n-butylmethacrylate and 8 parts of 1,6-hexanedioldiacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

COMPARISON EXAMPLE 1

In a 2-l reactor 216 parts of maleinized 1,2-polybutadiene (having a number average molecular weight of 3,000, an acid value of 100 and containing 74% of solid in ethylene glycol monobutyl ether) was neutralized with 0.95 equivalent of ammonia based on the carboxyl groups of the resin and then diluted with 780 parts of water and thoroughly dissolved therein by full stirring. 414 parts of n-butylmethacrylate was added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion.

COMPARISON EXAMPLE 2

Into a 2-l reactor 145 parts of phthalic anhydride, 173 parts of pentaerythritol, 693 parts of linseed oil fatty acid, 61 parts of benzoic acid, 54 parts of xylene and 2 parts of dibutyltin oxide were placed and reacted at 230° C. for 7 hours while being reacted to obtain resin having an acid value of 4.0. After the resin was cooled at about 90° C., 94 parts of maleic anhydride was added to the reactor and the resin was maleinized at 190° C.

for 7 hours. The xylene and unreacted maleic anhydride were distilled off at reduced pressure, followed by ring cleavage with water. The maleinized alkyd resin obtained has an acid value of 90.

In a 2-1 reactor 170 parts of maleinized alkyd resin was neutralized with 4.9 parts of triethylamine and 11.4 parts of 29% ammonia water solution and was then diluted with 759 parts of water and 56 parts of ethylene glycol monobutyl ether was added to the solution and thoroughly dissolved therein by full stirring. 406 parts of n-butylmethacrylate and 8 parts of 1,6-hexanedioldiacrylate were added to the resulting solution, and the mixture was thoroughly stirred to obtain a fully emulsified mass, to which a solution of one part of ammonium persulfate in 20 parts of water was added. The mixture was reacted for 2 hours with stirring and heating at 80° C. to obtain an emulsion. Table 1 shows the properties of the emulsion.

Each of the emulsion compositions obtained was applied by a bar coater to a polished mild steel panel to film thickness of 25 to 30μ and the coating was tested for properties. Table 1 shows the results.

The properties of the emulsion, the properties of the coating and the brushability of the composition with brush coating were determined by the following methods.

(1) Tolerance:
The composition was placed into a glass container on newspaper. The tolerance was expressed in terms of the maximum thickness of the layer of the composition through which No. 12 types on the newspaper were legible.

(2) Polymerization degree:
The emulsion was dried in a vacuum dryer at 130° C. for 2 hours, and the weight of the residue was measured to calculate the polymerization degree.

(3) Viscosity:
Water was removed from the emulsion, and the remaining mass was dissolved in ethylene glycol monobutyl ether. The viscosity of the solution (solid content: 15%) was measured at 25° C.

(4) Resistance to water:
The coating was immersed in water at 20° C. for one day and was thereafter checked for changes.

(5) Resistance to salt spray:
According to JIS Z 2371. After testing for one day, the width of the resulting rust from the cut portion was measured.

(6) Pencil scratch hardness:
The coating was scratched with pencils ("Mitsubishi Uni-pencil", 6B to 9H in hardness). The result was given in terms of the pencil hardness one degree below the hardness at which scratch was formed on the coating.

(7) Adhesiveness:
One hundred squares, 1 mm × 1 mm, were formed by a knife in the coating by cross cutting, a cellophane tape was adhered to the cut coating and then peeled off quickly, and the number (n) of the squares remaining on the panel was counted. Adhesiveness is expressed by n/100.

(8) Gel fraction ratio:
Calculated from the difference in the weight of coating before and after the coating was extracted with tetrahydrofuran.

(9) Weather-ometer gloss retentivity (%):
Lead naphthenate and cobalt naphthenate were added in amounts of 0.45% and 0.05% respectively, calculated as the corresponding metals, to water-soluble acrylic resin (having an acid value of 85 and oil length of 27 calculated as fatty acid content and composed of styrene and n-butyl methacrylate) which was dried at room temperature. Titanium dioxide was then dispersed in the mixture, and the dispersion was admixed, in an amount of 30 PHR (part per hundred resin) calculated as the acrylic resin, with the emulsion of this invention, the amount of the dispersed titanium dioxide being 80 PHR based on the total resin solids of the mixture finally prepared.

The resulting composition was applied to a coating of oil-based primer (JIS-K-5621) and the coated panel was tested for 250 hours on a weather-ometer of the sunshine type and the coatings were thereafter checked for gloss retentivity.

(10) Color of film:
The apperence of the film was inspected by naked eye. The film was obtained from the same composition as mentioned in (9) after drying at room temperature for 7 days.

(11) Brushability of the compositions:
The same composition as mentioned in (9) was applied by a brush onto the film of emulsion of vinyl acetate homopolymer.

Table 1

| | Example | | | | | | Comparison example | |
|---|---|---|---|---|---|---|---|---|
| | 1 | 2 | 3 | 4 | 5 | 6 | 1 | 2 |
| Properties of emulsion | | | | | | | | |
| Solid content (%) | 39.5 | 39.6 | 39.6 | 39.4 | 39.7 | 39.7 | 39.7 | 39.7 |
| Viscosity (poises) (on B-type viscosimeter at 12 γpm and 20° C) | 0.50 | 0.45 | 2.10 | 0.75 | 2.80 | 1.80 | 6.50 | 2.50 |
| Particle size (μ) | 0.08 | 0.10 | 0.15 | 0.10 | 0.28 | 0.20 | 0.17 | 0.15 |
| Tolerance 1) (mm) | 5.0 | 4.0 | 2.20 | 2.30 | 1.0 | 1.21 | 1.85 | 2.30 |
| Polymerization degree 2) (%) | 100 | 100 | 100 | 100 | 100 | 100 | 100 | 100 |
| Viscosity of emulsion as dissolved in ethylene glycol monobutyl ether 3) | Z | Z—$Z_1$ | Z | Z | Z | X—Y | Highly viscous partially insoluble | X |
| Properties of coating after drying for 7 days | | | | | | | | |
| Resistance to water 4) | No change | No change | No change | No change | No change | No change | No change | No change |
| Resistance to salt spray 5) (mm) | 1.5 | 2.0 | 2.0 | 1.5 | 2.0 | 2.0 | 1.0 | 3.0 |

Table 1-continued

| | Example | | | | | | Comparison example | |
|---|---|---|---|---|---|---|---|---|
| | 1 | 2 | 3 | 4 | 5 | 6 | 1 | 2 |
| Pencil scratch hardness 6) | HB | HB | HB | HB | HB | HB | F | B |
| Adhesiveness 7) | 100/100 | 100/100 | 100/100 | 100/100 | 100/100 | 100/100 | 100/100 | 100/100 |
| Gel fraction ratio 8) (%) | 38.2 | 41.2 | 83.0 | 40.1 | 85.6 | 84.1 | 87.2 | 69.9 |
| Weather-ometer gloss retentivity 9) (%) | 91 | 90 | 91 | 89 | 88 | 91 | 60 | 79 |
| Color of film 10) | white | white | white | white | white | white | slightly yellow | slightly brown |
| Bushability of the composition 11) | | | | | | | | |
| At high temp. and low humidity (30° C, 80% R.H.) | Good | Good | Good | Good | Good | Good | Dries too quickly, unacceptable | Good |
| At low temp. and high humidity (5° C, 80% R.H.) | Good | Good | Good | Good | Good | Good | Cracks occur | Good |
| Under ordinary conditions | Good | Good | Good | Good | Good | Good | Irregularities in coating* | Good |

*The composition was not smoothly applicable, producing irregularities in the coating.

What we claim is:

1. An emulsion composition prepared by the emulsion polymerization of a polymerizable vinyl monomer in the presence of an emulsifier characterized in that the emulsifier is a neutralized copolymer having an acid value of about 40 to 180 and an average molecular weight of about 500 to 50,000 comprising (A) 7.5 to 90 wt.% of a monomer prepared by reacting at least one glycidyl ester of acrylic acid and methacrylic acid with at least one fatty acid of drying oil fatty acid and semi-drying oil fatty acid in a mole ratio of said fatty acid to said glycidyl ester of from 0.8 to 1.2:1, (B) 8 to 30 wt.% of an α,β-ethylenically unsaturated acid and (C) 2 to 87.5 wt.% of an unsaturated monomer containing substantially no carboxyl group and having a Q value of at least 0.1 as determined by Q-e theory, said polymerizable vinyl monomer being free from active radicals reactive with drying oil fatty acid or semi-drying oil fatty acid, and said emulsifier and said polymerizable vinyl monomer being used in such proportions that the total solid content of the resulting emulsion has an acid value of about 3 to about 150.

2. An emulsion composition as defined in claim 1 wherein the polymerizable vinyl monomer to be subjected to emulsion polymerization is at least one compound selected from the group consisting of:

esters represented by the formula $CH_2=C(R_{10})COOR_{11}$ wherein $R_{10}$ is hydrogen or $CH_3$, and $R_{11}$ is alkyl having 1 to 26 carbon atoms;

esters represented by the formula $CH_2=C(R_{10})COOR_{12}$ wherein $R_{10}$ is as defined above, $R_{12}$ is

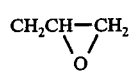

$CH_2CH(OH)CH_2OCOR_{13}$, $(CH_2CH_2O)_nR_{14}$,

$CH_2CH=CH_2$, $CH_2CH_2CH_2OH$, $CH_2CH(CH_3)OH$ or $CH_2CH_2OCH_2Cl=CH_2$ $R_{13}$ is hydrogen or alkyl having one to 25 carbon atoms, $R_{14}$ is alkyl having one to 8 carbon atoms, and $n$ is an integer of 1 to 8;

esters represented by the formula $CH_2=C(CH_3)COOR_{15}$ wherein $R_{15}$ is $CH_2CH_2OH$;

diolefins represented by the formula $R_{16}CH=C(R_{17})CH=CH_2$ wherein $R_{16}$ is hydrogen or $CH_3$, and $R_{17}$ is hydrogen, $CH_3$ or $Cl$;

styrene, vinyltoluene, α-methylstyrene, methacrylonitrile, addition product of acrylic acid or methacrylic acid and glycidyl ester of tertiary carboxylic acid, vinyl acetate and vinyl ester of tertiary carboxylic acid monomers.

3. An emulsion composition as defined in claim 2 wherein the polymerizable vinyl monomer is used conjointly with up to 20% by weight of water-soluble or hydrophilic vinyl monomer, the water-soluble or hydrophilic vinyl monomer being at least one compound selected from the group consisting of:

carboxylic acid represented by the formula $CH_2=C(R_{21})COOH$ wherein $R_{21}$ is hydrogen or $CH_3$;

carboxylic acid amides represented by the formula $CH_2=C(R_{21})CONHR_{22}$ wherein $R_{21}$ is as defined above, and $R_{22}$ is hydrogen, $CH_2OH$ or $CH_2OC_4H_9$;

compounds represented by the formula $CH_2=CHR_{23}$ wherein $R_{23}$ is CN or CHO;

N-methylacrylamide, N-ethylacrylamide, dimethylaminoethyl methacrylate, diethylaminoethyl methacrylate, hydroxyethyl acrylate, vinylpyridine and vinylpyrrolidone.

4. An emulsion composition as defined in claim 3 wherein the amount of water-soluble or hydrophilic vinyl monomer is up to 10% by weight.

5. An emulsion composition as defined in claim 1 wherein the acid value is about 15 to about 50.

6. An emulsion composition as defined in claim 1 wherein the concentration of the solids in the emulsion is about 15 to about 65% by weight.

* * * * *